United States Patent
Cho (10) Patent No.: US 10,471,833 B2
(45) Date of Patent: Nov. 12, 2019

(54) HYBRID VEHICLE AND BRAKING METHOD THEREOF

(71) Applicant: Hyundai Motor Company, Seoul (KR)

(72) Inventor: Woo Cheol Cho, Daejeon (KR)

(73) Assignee: Hyundai Motor Company, Seoul (KR)

( * ) Notice: Subject to any disclaimer, the term of this patent is extended or adjusted under 35 U.S.C. 154(b) by 42 days.

(21) Appl. No.: 15/260,124

(22) Filed: Sep. 8, 2016

(65) Prior Publication Data

US 2017/0166063 A1  Jun. 15, 2017

(30) Foreign Application Priority Data

Dec. 9, 2015 (KR) .......................... 10-2015-0175066

(51) Int. Cl.
*B60L 7/26* (2006.01)
*B60L 7/18* (2006.01)
(Continued)

(52) U.S. Cl.
CPC ............... *B60L 7/26* (2013.01); *B60L 7/18* (2013.01); *B60L 15/2009* (2013.01); *B60T 1/10* (2013.01); *B60T 8/17* (2013.01); *B60T 13/586* (2013.01); *B60W 10/08* (2013.01); *B60W 10/184* (2013.01); *B60W 30/18127* (2013.01); *F16D 61/00* (2013.01); *B60L 2240/423* (2013.01); *B60L 2240/80* (2013.01); *B60L 2260/44* (2013.01); *B60T 2270/604* (2013.01); *B60W 2710/18* (2013.01); *B60Y 2300/89* (2013.01); *B60Y 2400/81* (2013.01); *Y02T 10/645* (2013.01); *Y02T 10/72* (2013.01); *Y02T 10/7275* (2013.01); *Y10S 903/903* (2013.01); *Y10S 903/947* (2013.01)

(58) Field of Classification Search
CPC ..... B60L 7/26; B60L 7/18; B60T 8/17; B60T 13/586; B60T 2270/604; B60W 10/08; B60W 10/184; B60W 30/18127; B60W 2710/18; B60Y 2300/89; B60Y 2400/81; Y10S 903/903; Y10S 903/947
USPC ............................................ 303/3, 151, 152
See application file for complete search history.

(56) References Cited

U.S. PATENT DOCUMENTS 5,511,859 A * 4/1996 Kade ..................... B60K 6/442
                                                                188/156
5,839,800 A * 11/1998 Koga ........................ B60K 6/46
                                                                188/156

(Continued)

FOREIGN PATENT DOCUMENTS

JP  2000-264184 A  9/2000
JP  2001-008306 A  1/2001
(Continued)

*Primary Examiner* — Vishal R Sahni
(74) *Attorney, Agent, or Firm* — Mintz Levin Cohn Ferris Glovsky and Popeo, P.C.

(57) ABSTRACT

A hybrid vehicle and a braking method thereof are provided. The braking method includes determining a current braking situation based on a brake depth and calculating an amount of braking demanded by a driver corresponding to the brake depth when the current braking situation is a general braking situation. A regenerative braking command is generated to execute regenerative braking and a friction braking command to execute friction braking based on the amount of braking demanded by the driver.

13 Claims, 7 Drawing Sheets

(51) Int. Cl.
*B60T 13/58* (2006.01)
*B60W 30/18* (2012.01)
*B60W 10/08* (2006.01)
*B60W 10/184* (2012.01)
*B60T 8/17* (2006.01)
*B60T 1/10* (2006.01)
*B60L 15/20* (2006.01)
*F16D 61/00* (2006.01)

(56) References Cited

U.S. PATENT DOCUMENTS

| | | | | |
|---|---|---|---|---|
| 6,663,197 | B2* | 12/2003 | Joyce | B60L 7/26 188/156 |
| 7,136,737 | B2* | 11/2006 | Ashizawa | B60L 7/26 303/152 |
| 8,152,245 | B2* | 4/2012 | Lubbers | B60K 6/48 303/151 |
| 9,022,486 | B2* | 5/2015 | Maki | B60K 6/445 303/3 |
| 9,533,581 | B2* | 1/2017 | Huh | B60L 7/26 |
| 2003/0184155 | A1* | 10/2003 | Crombez | B60L 7/26 303/152 |
| 2005/0143878 | A1* | 6/2005 | Park | B60K 6/48 701/22 |
| 2007/0222287 | A1* | 9/2007 | Crombez | B60L 7/18 303/151 |
| 2012/0031692 | A1* | 2/2012 | Koike | B60K 6/48 180/65.25 |
| 2012/0136547 | A1* | 5/2012 | Miyazaki | B60T 1/10 701/70 |
| 2013/0162009 | A1* | 6/2013 | Mitts | B60L 3/102 303/3 |
| 2017/0015203 | A1* | 1/2017 | Oguri | B60L 7/18 |
| 2017/0015204 | A1* | 1/2017 | Oguri | B60L 7/18 |
| 2017/0015314 | A1* | 1/2017 | Tanase | B60W 30/09 |
| 2017/0015323 | A1* | 1/2017 | Oguri | B60W 30/18127 |

FOREIGN PATENT DOCUMENTS

| | | |
|---|---|---|
| JP | 2006-044654 A | 2/2006 |
| JP | 2007-050751 A | 3/2007 |
| JP | 5201267 B2 | 6/2013 |
| JP | 2014-180160 A | 9/2014 |
| KR | 10-1152013 B1 | 11/2011 |
| KR | 10-2014-0083398 A | 7/2014 |

* cited by examiner

| | t0 | t1 | t2 | t3 | t4 | t5 |
|---|---|---|---|---|---|---|
| AMOUNT OF BRAKING DEMANDED BY DRIVER(Nm) | 0 | 10 | 20 | 30 | 40 | 40 |
| ALLOWABLE AMOUNT OF REGENERATIVE BRAKING(Nm) | 0 | 10 | 20 | 30 | 40 | 40 |
| EXECUTION AMOUNT OF REGENERATIVE BRAKING(Nm) | 0 | 0 | 10 | 20 | 30 | 40 |
| AMOUNT OF FRICTION BRAKING(Nm) | 0 | 10 | 10 | 10 | 10 | 0 |
| TOTAL AMOUNT OF BRAKING(Nm) | 0 | 20 | 30 | 40 | 50 | 40 |

|  | t0 | t1 | t2 | t3 | t4 | t5 |
|---|---|---|---|---|---|---|
| AMOUNT OF BRAKING DEMANDED BY DRIVER(Nm) | 0 | 10 | 20 | 30 | 40 | 40 |
| AMOUNT OF REGENERATIVE BRAKING(Nm) | 0 | 10 | 20 | 30 | 40 | 40 |
| AMOUNT OF FRICTION BRAKING(Nm) | 0 | 0 | 0 | 0 | 0 | 0 |
| TOTAL AMOUNT OF BRAKING(Nm) | 0 | 10 | 20 | 30 | 40 | 40 |

HYBRID VEHICLE AND BRAKING METHOD THEREOF

CROSS-REFERENCE TO RELATED APPLICATION(S)

This application claims the benefit of Korean Patent Application No. 10-2015-0175066, filed on Dec. 9, 2015, which is hereby incorporated by reference as if fully set forth herein.

BACKGROUND

Field of the Invention

The present invention relates to a hybrid vehicle and a braking method thereof, and more particularly, to a hybrid vehicle which adaptively varies a braking method based on braking situations, and a braking method thereof.

Discussion of the Related Art

In general, a hybrid vehicle using two or more different types of power sources refers to a vehicle which is driven by an engine that acquires driving force by burning a fuel and a motor that acquires driving force from power of a battery. In such a hybrid vehicle, when braking control by a brake pedal is executed during driving of the vehicle, a motor assisting output torque of an engine enters regenerative braking and captures deceleration energy thus charging a battery. In other words, regenerative braking is technology in which electric energy is generated by applying counter-torque to a motor using energy generated during braking and the generated electric energy is stored in a battery.

In such regenerative braking, when a driver's braking demand is detected, a hybrid control unit (HCU) is configured to calculate a total amount of braking and calculate an amount of regenerative braking based on an operating state of the motor and a current gear. Further, an electronic brake system (EBS) satisfies braking, acquired by subtracting the amount of regenerative braking from the total amount of braking, through an amount of hydraulic (friction) braking. In other words, braking of the hybrid vehicle is performed by cooperative control between the hybrid control unit (HCU) that executes hydraulic braking and the electronic brake system (EBS) that executes regenerative braking.

However, in a transmission mounted electric device (TMED) type hybrid vehicle to which a multi-range transmission is connected, an amount of regenerative braking is estimated based on real torque of a motor disposed at the front end of the transmission. However, when the amount of regenerative braking is estimated based on real torque of the motor, there is a difference between braking force demanded by a user and braking force based on real torque of the motor due to a time delay occurring between a point of time when the user demands braking and a point of time when braking is executed based on real torque of the motor. Such a difference may cause unnecessary power loss.

SUMMARY

Accordingly, the present invention provides a hybrid vehicle and a braking method thereof that substantially obviate one or more problems due to limitations and disadvantages of the related art. An object of the present invention is to provide a hybrid vehicle which adaptively executes a braking method based on braking situations to reduce friction braking and to improve fuel efficiency and drivability, and a braking method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a braking method of a hybrid vehicle may include determining a current braking situation based on a brake depth (e.g., brake engagement), calculating, by a hybrid controller (e.g., HCU), an amount of braking demanded by a driver corresponding to the brake depth, when the current braking situation is a general braking situation, and generating, by the hybrid controller, a regenerative braking command to adjust regenerative braking and a friction braking command to adjust friction braking based on the amount of braking demanded by the driver.

The braking method may further include operating an inverter connected to a motor based on the regenerate braking command to generate counter-torque that corresponds to an amount of regenerative braking, and executing braking by brake cylinders of respective wheels based on the friction braking command. When the vehicle is not in a regenerative limitation situation of a motor, an amount of regenerative braking distributed to the regenerative braking command may be the same as the amount of braking demanded by the driver.

The braking method may further include calculating, by an electric brake system, the amount of braking demanded by the driver that corresponds to the brake depth, when the current braking situation is an emergency braking situation, and executing, by the electric brake system, friction braking based on the amount of braking demanded by the driver and an execution amount of regenerative braking, acquired by monitoring a degree of execution of regenerative braking.

The determination of the current braking situation may include determining the current braking situation as the general braking situation when the brake depth is less than a first value and a variation of the brake depth is less than a second value. Additionally, the determination of the current braking situation may include determining the current braking situation as an emergency braking situation when the brake depth is a first value or greater or a variation of the brake depth is a second value or greater.

In another aspect of the present invention, a hybrid vehicle may include an electric brake system configured to determine a current braking situation based on a brake depth, and a hybrid controller configured to calculate an amount of braking demanded by a driver that corresponds to the brake depth, when the current braking situation is a general braking situation, and to generate a regenerative braking command to execute regenerative braking and a friction braking command to execute friction braking based on the amount of braking demanded by the driver.

In yet another aspect of the present invention, a braking method of a hybrid vehicle may include determining a current braking situation based on a brake depth and a variation of the brake depth, and operating one of an electric brake system and a hybrid controller to calculate an amount of braking demanded by a driver that corresponds to the brake depth and an amount of friction braking for executing friction braking based on the current braking situation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. The suffixes "module" and "unit" used in the description below are given or used together only in consideration of ease in preparation of the specification and do not have distinctive meanings or functions.

Figure 1:
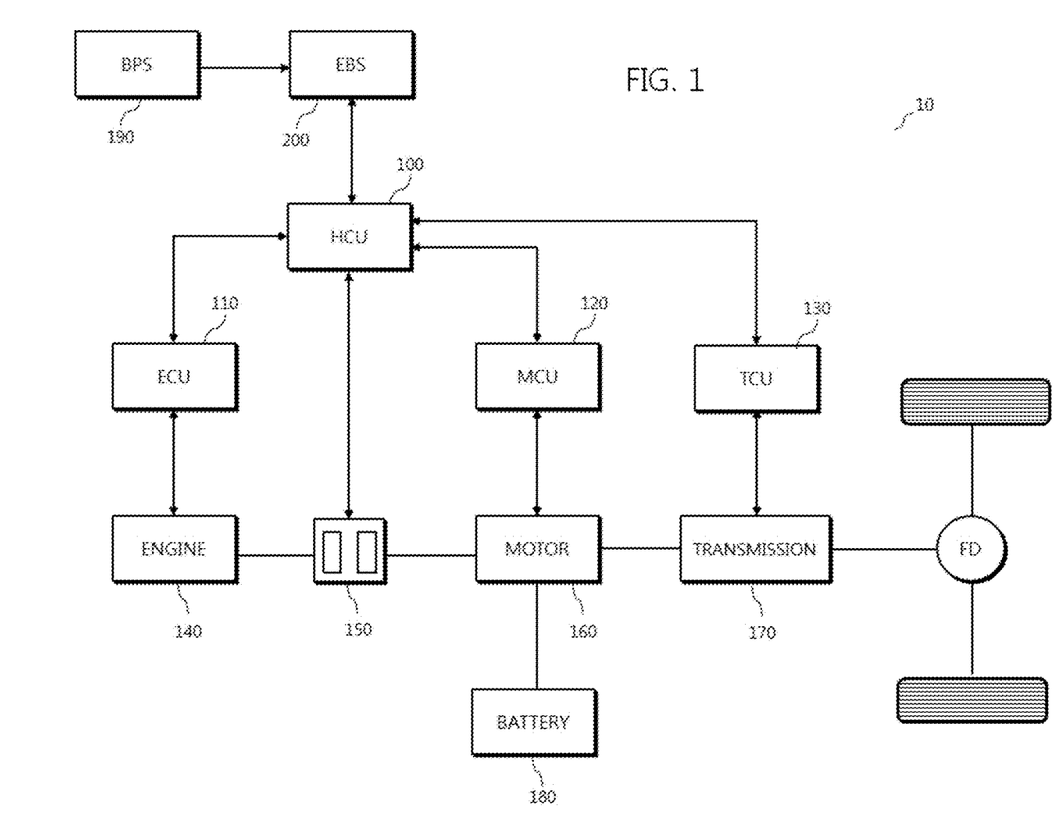
FIG. 1 is a block diagram illustrating a general hybrid vehicle to which a braking method of a hybrid vehicle in accordance with one exemplary embodiment of the present invention is applied.

FIG. 1 is a block diagram illustrating a general hybrid vehicle to which a braking method of a hybrid vehicle in accordance with one exemplary embodiment of the present invention is applied. With reference to FIG. 1, a hybrid vehicle 10 is exemplarily illustrated for convenience of description. Therefore, a braking method of a hybrid vehicle in accordance with one exemplary embodiment of the present invention may be applied to the hybrid vehicle 10 of FIG. 1 and also to all hybrid vehicles.

As exemplarily shown in FIG. 1, the hybrid vehicle 10 to which the exemplary embodiment of the present invention is applied may include a hybrid control unit (HCU) 100, an engine control unit (ECU) 110, a motor control unit (MCU) 120, a transmission control unit (TCU) 130, an engine 140, an engine clutch 150, a motor 160, a transmission 170, a battery 180, a brake pedal position sensor (BPS) 190, and an electric brake system (EBS) 200. The various controllers, components, and sensors may be operated by an overall vehicle controller.

For example, the HCU 100 may be a highest-level controller configured to drive or operate the other controllers, set hybrid driving modes and execute overall operation of the hybrid vehicle 10. The HCU 100 may be configured to execute integrated operate of low-level controllers connected via a network (e.g., a controller area network (CAN)) and thus may be configured to adjust output torques of the engine 140 and the motor 160. The hybrid vehicle 10 may be a transmission mounted electric device (TMED) type in which a motor is attached to an automatic transmission, and the hybrid driving modes may include an electric vehicle (EV) mode which is a pure electric vehicle mode using power of the motor 160, a hybrid electric vehicle (HEV) mode using the engine 140 as a main power source and the motor 160 as a subsidiary power source, and a regenerative braking (RB) mode in which, when the vehicle 10 is decelerated (e.g., brake pedal is engaged) or driven by inertia, braking or inertia energy of the vehicle 10 may be recovered through power generation of the motor 160 and the battery 180 may be charged.

The ECU 110 may be configured to execute the overall operation of the engine 140 based on a driver demand torque signal, a cooling water temperature and engine state information, such as engine torque. The MCU 120 may be configured to execute the overall operation of the motor 160 based on the driver demand torque signal, a driving mode of the hybrid vehicle 10 and a state of charge (SOC) state of the battery 180. The TCU 130 may be configured to execute multi-range transmission control of the transmission 170 based on output torques of the ECU 110 and the MCU 120 and provide a current transmission state which is a factor for estimating an amount of regenerative braking.

The engine 140 may operate as a power source and may be configured to output power in a starting-on state. The engine clutch 150 may be disposed between the engine 140 and the motor 160 may be configured to receive a control signal from the HCU 100 and selectively connect the engine 140 and the motor 160 to each other based on the driving modes of the hybrid vehicle 10. The motor 160 may be operated by 3 phase alternating current (AC) voltage applied through an inverter by the battery 180, generate torque, may be operated as a power generator in the regenerative braking mode, and supply regenerative energy to the battery 180.

The transmission 170 may be configured to receive the sum of output torque of the engine 140 and output torque of the motor 160, determined by engagement and release of the engine clutch 150, as input torque, select an arbitrary gear based on a vehicle velocity and driving conditions, and output driving force to driving wheels, thereby maintaining driving of the vehicle 100. The battery 180 may include a plurality of unit cells and stores high voltage for providing voltage to the motor 160, for example, direct-current (DC) voltage of 400 V to 450 V.

The BPS 190 may be configured to continuously measure (or sense) a position value of a brake pedal (e.g., an engaged degree or an amount of pressure exerted onto the brake pedal) and transmit a brake depth and a brake depth variation to the EBS 200. Particularly, the brake depth may be a value acquired by calculating the engaged degree of the brake pedal into a designated unit (e.g., mm), and the brake depth variation may be a value indicating a degree of change of the brake depth per unit time (e.g., 10 ms).

The EBS 200 may be configured to determine whether a current braking situation is an emergency braking situation based on the brake depth and the brake depth variation. According to the exemplary embodiments, when the brake depth is a first value (e.g., A (an arbitrary positive number) mm) or greater or when the brake depth variation is a second value (e.g., B (an arbitrary real number) mm/10 ms), it may be determined that the current braking situation is the emergency braking situation. Similarly, when the brake depth is less than the first value and the brake depth variation is less than the second value, it may be determined that the current braking situation is not the emergency braking situation but is a general braking situation. Although this will be described later with reference to FIGS. 2 to 8, the subject of vehicle braking control becomes the EBS 200 in the emergency braking situation, and becomes the HCU 100 in the general braking situation. The EBS 200 may be configured to adjust hydraulic braking supplied to brake cylinders of the respective wheels autonomously or based on a signal from the HCU 100.

Figure 2:
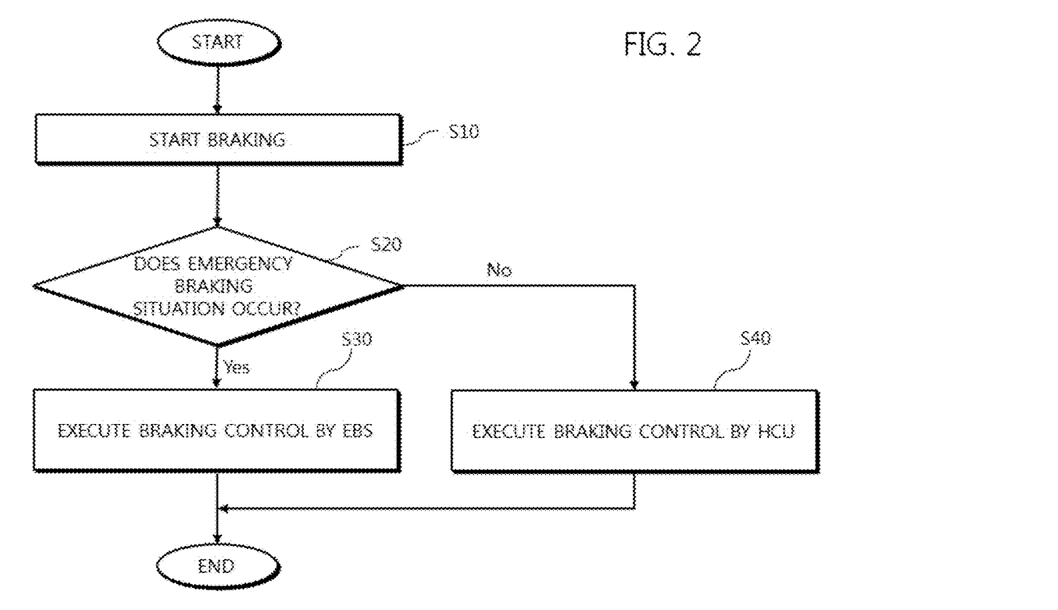
FIG. 2 is a flowchart illustrating a braking method of a hybrid vehicle in accordance with one exemplary embodiment of the present invention.
Figure 3:
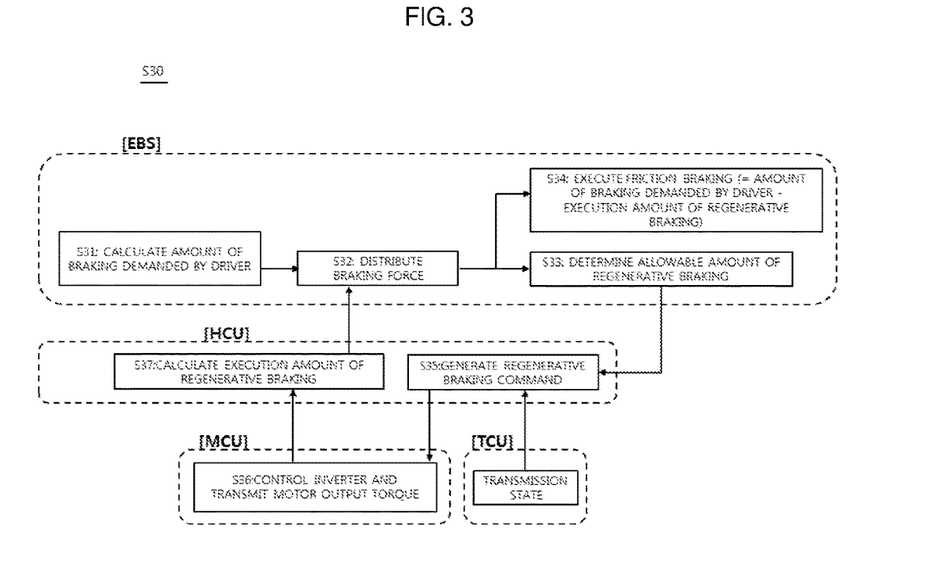
FIG. 3 is a flowchart illustrating Operation S30 shown in FIG. 2 in more detail in accordance with one exemplary embodiment of the present invention.
Figure 4:
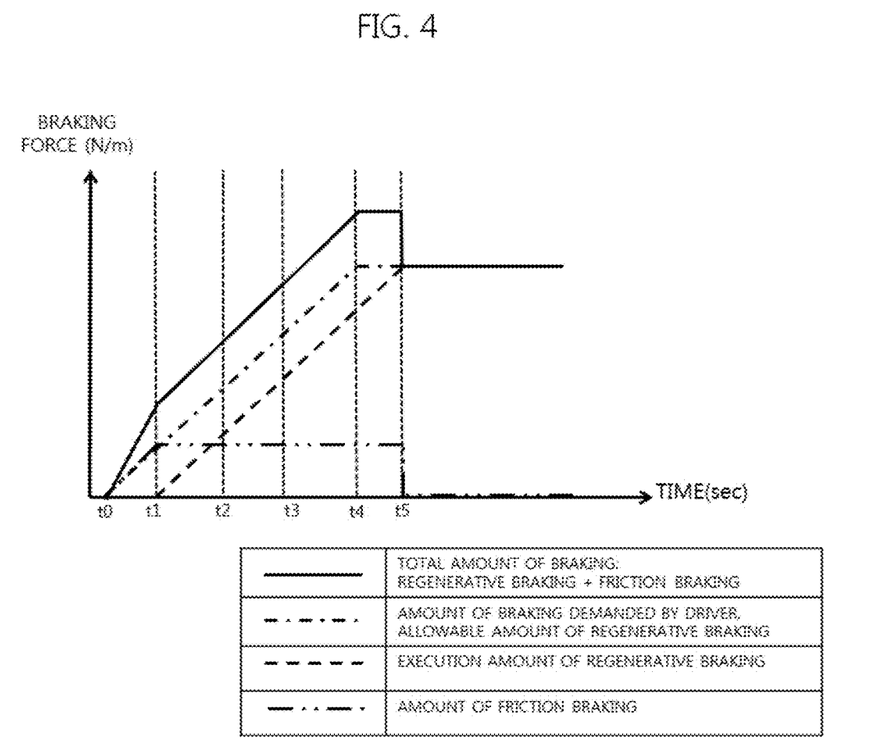
FIG. 4 is a graph illustrating the braking method according to Operation S30 shown in FIG. 2 in accordance with one exemplary embodiment of the present invention.
Figure 5:
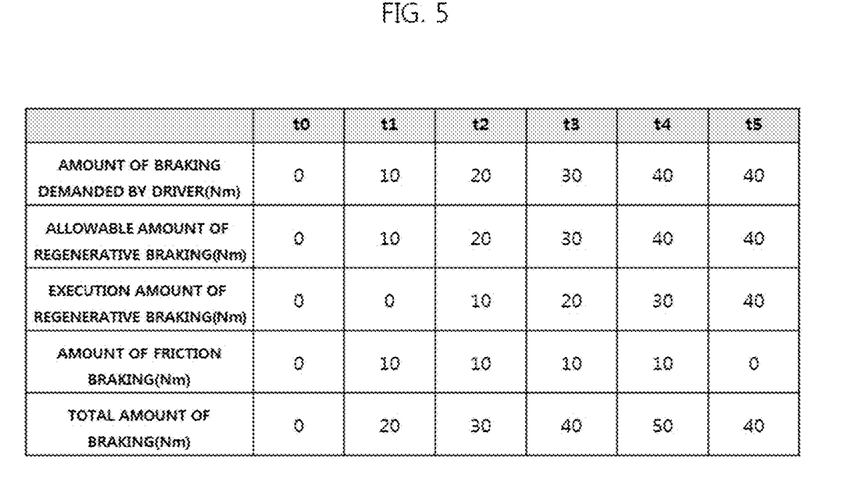
FIG. 5 is a table illustrating the braking method according to Operation S30 shown in FIG. 2 in accordance with one exemplary embodiment of the present invention.
Figure 6:
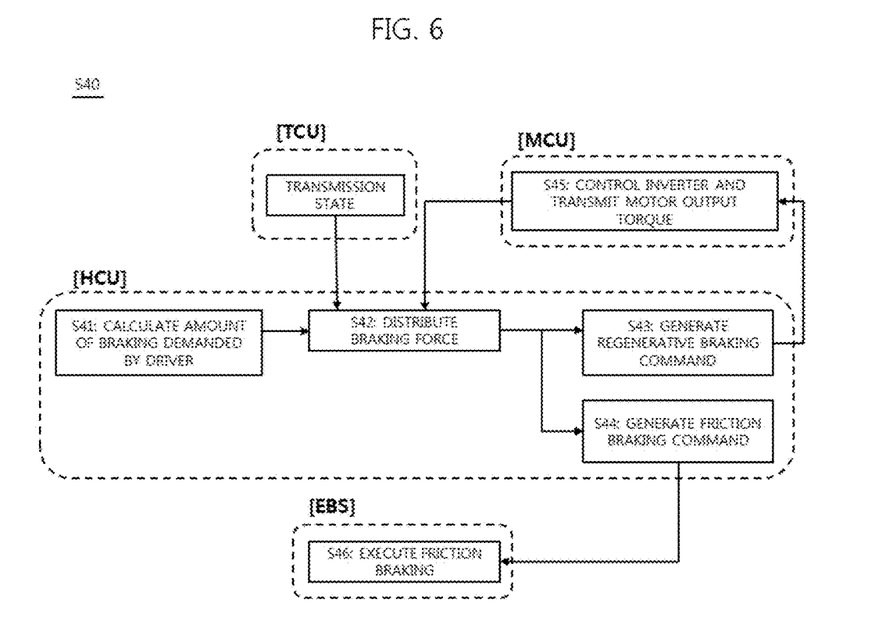
FIG. 6 is a flowchart illustrating Operation S40 shown in FIG. 2 in more detail in accordance with one exemplary embodiment of the present invention.
Figure 7:
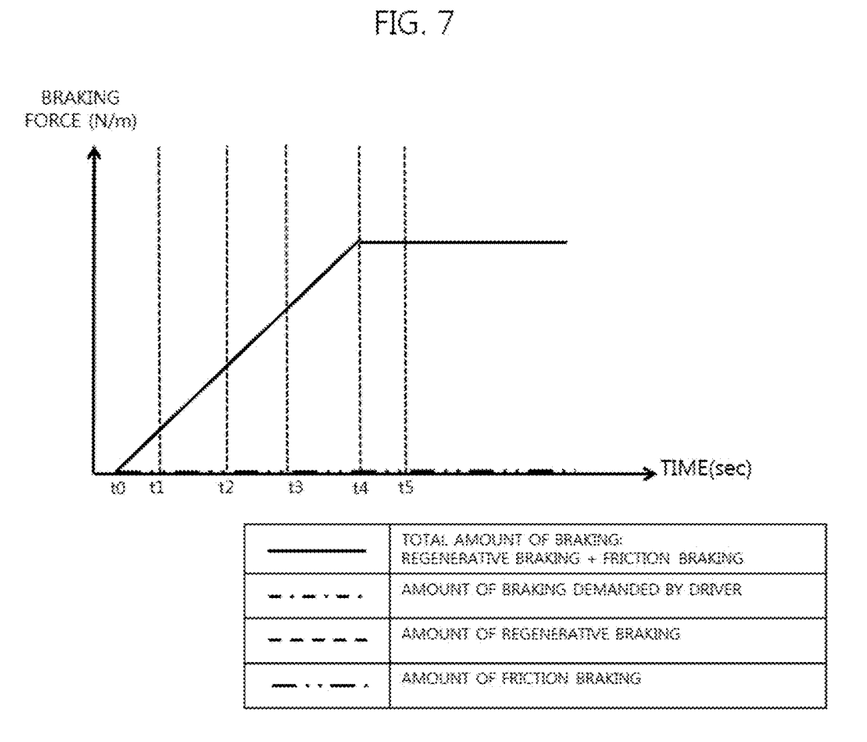
FIG. 7 is a graph illustrating the braking method according to Operation S40 shown in FIG. 2 in accordance with one exemplary embodiment of the present invention.
Figure 8:
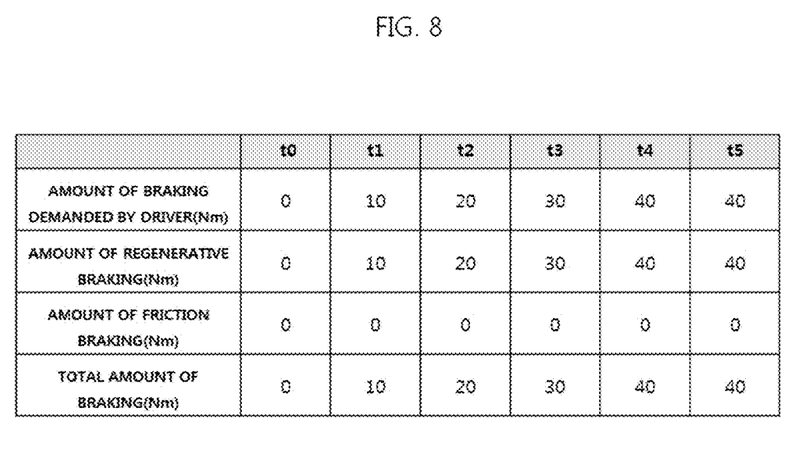
FIG. 8 is a table illustrating the braking method according to Operation S40 shown in FIG. 2 in accordance with one exemplary embodiment of the present invention.

FIG. 2 is a flowchart illustrating a braking method of a hybrid vehicle in accordance with one exemplary embodiment of the present invention. FIG. 3 is a flowchart illustrating Operation S30 shown in FIG. 2 in more detail. FIG. 4 is a graph illustrating the braking method according to Operation S30 shown in FIG. 2. FIG. 5 is a table illustrating the braking method according to Operation S30 shown in FIG. 2. FIG. 6 is a flowchart illustrating Operation S40 shown in FIG. 2 in more detail. FIG. 7 is a graph illustrating the braking method according to Operation S40 shown in FIG. 2. FIG. 8 is a table illustrating the braking method according to Operation S40 shown in FIG. 2.

With reference to FIGS. 1 to 8, when a driver engages the brake pedal, the BPS 190 may be configured to calculate a brake depth and a brake depth variation and transmit the calculated brake depth and brake depth variation to the EBS 200 (Operation S10). The EBS 200 may then be configured to determine whether a current braking situation is an emergency braking situation based on the brake depth and the brake depth variation (Operation S20).

When the current braking situation is the emergency braking situation (e.g., as stated above with reference to FIG. 1, when the brake depth is the first value or greater or when the brake depth variation is the second value or greater) (Yes of Operation S20), the EBS 200 may be configured to autonomously execute braking control operation (Operation S30). Further, when the current braking situation is a general braking situation (e.g., as stated above with reference to FIG. 1, when the brake depth is less than the first value and the brake depth variation is less than the second value) (No of Operation S20), the HCU 100 may be configured to execute braking control operation (Operation S40). For this purpose, the EBS 200 may be configured to generate a control authority transfer signal to operate the HCU 100 to execute braking control operation and transmit the control authority transfer signal to the HCU 100.

FIG. 3 illustrates Operation S30 in more detail. The EBS 200 may be configured to calculate an amount of braking demanded by the driver from the brake depth (Operation S31). The amount of braking demanded by the driver may be a value determined in proportion to the brake depth that corresponds to an engaged degree of the brake pedal, and indicates an amount of braking demanded by the driver to brake, stop, or decelerate the hybrid vehicle 100. The unit of the amount of braking demanded by the driver may be Nm or N·m, i.e., Newton-meters.

The EBS 200 may be configured to distribute the amount of braking demanded by the driver between friction braking (or hydraulic braking) by the brake cylinders of the respective wheels and regenerative braking by the motor 160 based on the amount of braking demanded by the driver and an execution amount of regenerative braking supplied from the HCU 100 (Operation S32). The execution amount of regenerative braking may be a value calculated based on motor output torque of the MCU 120, and may be acquired by monitoring an actual execution degree of regenerative braking. Prior to the braking situation, the execution amount of regenerative braking may have an initial value of 0 and the unit of the execution amount of regenerative braking may be Newton-meters.

Further, the EBS 200 may be configured to determine an allowable amount of regenerative braking based on the amount of braking demanded by the driver (Operation S33), and determine the amount of regenerative braking to be the same as the amount of braking demanded by the driver unless the vehicle 10 is in a regenerative limitation situation of the motor 160 (e.g., when the amount of braking demanded by the driver may not be satisfied by regenerative braking). The EBS 200 may be configured to receive information regarding the state of the motor 160 and the state of the battery 180 from the MCU 120 and determine the regenerative limitation situation. The allowable amount of regenerative braking may be a value to execute regenerative braking by the motor 160 and the unit of the allowable amount of regenerative braking may be Newton-meters.

The EBS 200 may be configured to execute friction braking as much as an amount of friction braking based on the amount of braking demanded by the driver and the execution amount of regenerative braking (Operation S34). The amount of friction braking may be a value acquired by subtracting the execution amount of regenerative braking from the amount of braking demanded by the driver, i.e., a value to compensate for the remainder, acquired by excluding the amount of braking executed by regenerative braking from the amount of braking demanded by the driver, through friction braking. The unit of the amount of friction braking is Newton-meters.

The HCU 100 may be configured to generate a regenerative braking command based on the transmission state of the TCU 130 and the motor state of the MCU 120 based on the allowable amount of regenerative braking (Operation S35). The regenerative braking command may be a signal to operate the inverter connected to the motor 160 to generate counter-torque corresponding to the allowable amount of regenerative braking.

The MCU 120 may be configured to operate the inverter connected to the motor 160 based on the regenerative braking command to generate counter-torque corresponding to the allowable amount of regenerative braking, and transmit output torque of the motor 160 to the HCU 100 (Operation S36). The HCU 100 may be configured to calculate the execution amount of regenerative braking based on the output torque of the motor 160 (Operation S37), and transmit the calculated execution amount of regenerative braking to the EBS 200.

The above-described Operations S31 to S37 included in Operation S30 may be repeated in a designated cycle. With reference to FIGS. 4 and 5, it may be assumed that, as the brake pedal is engaged by the driver at time t0, the amount of braking demanded by the driver linearly increases up to time t4 and is thereafter uniformly maintained. Accordingly, the allowable amount of regenerative braking may be determined as being the same as the amount of braking demanded by the driver. At time t0, the amount of braking demanded by the driver, the allowable amount of regenerative braking, the execution amount of regenerative braking, the amount of friction braking and the total amount of braking are 0.

Further, between time t0 and time t1, as the amount of braking demanded by the driver increases, the allowable amount of regenerative braking may increase. However, due to a time delay, which will be described later, the execution amount of regenerative braking increases after time t1 and thus, the EBS 200 may be configured to increase the amount of friction braking in proportion to the amount of braking demanded by the driver in the section from time t0 to time t1. When the EBS 200 executes distribution of braking force at time t1, under the assumption that the amount of braking demanded by the driver is 10, the allowable amount of regenerative braking may be determined as being 10, which is the amount of braking demanded by the driver.

Although the allowable amount of regenerative braking may be determined as being 10, the execution amount of regenerative braking corresponds to 0. This is caused by a time delay during execution of generation of the regenerative braking command (Operation S35), operation of the inverter and transmission of motor output torque (Operation S36) and generation and transmission of the execution amount of regenerative braking (Operation S37) after determination of the allowable amount of regenerative braking (Operation S33).

The amount of friction braking may be a value acquired by subtracting the execution amount of regenerative braking from the amount of braking demanded by the driver and thus may be determined as being 10. Therefore, the total amount of braking, i.e., the sum of the allowable amount of regenerative braking and the amount of friction braking, becomes 20. In other words, at time t1, the total amount of braking may be greater than the amount of braking demanded by the driver, i.e., an amount of braking substantially demanded by the driver.

At each of time t2 to time t4, the EBS 200 may be configured to execute distribution of braking force, and the amount of friction braking maintains 10 due to a time delay during execution of generation of the regenerative braking command (Operation S35), operation of the inverter and transmission of motor output torque (Operation S36) and generation and transmission of the execution amount of regenerative braking (Operation S37) after determination of the allowable amount of regenerative braking (Operation S33).

Moreover, at time t5, the execution amount of regenerative braking may increase to 40 and, thus, there is no difference between the amount of braking demanded by the driver and the execution amount of regenerative braking, the amount of friction braking becomes 0, and the total amount of braking becomes the same as the amount of braking demanded by the driver. In other words, when the current braking situation is the emergency braking situation, initial braking performance may be improved so that the total amount of braking is greater than the amount of braking demanded by the driver and, thus, driving stability may be increased.

FIG. 6 illustrates Operation S40 in more detail. The HCU 100 may be configured to receive the brake depth together with the control authority transfer signal from the EBS 200 and calculate the amount of braking demanded by the driver from the brake depth (Operation S41). The HCU 100 may further be configured to distribute the amount of braking demanded by the driver between friction braking (or hydraulic braking) by the brake cylinders of the respective wheels and regenerative braking by the motor 160, based on the transmission state of the TCU 130 and the motor state of the MCU 120, such as motor output torque (Operation S42).

The HCU 100 may be configured to generate a regenerative braking command to execute regenerative braking (Operation S43) and generate a friction braking command to execute friction braking (Operation S44). The HCU 100 may then be configured to distribute the entire amount of braking demanded by the driver to the regenerative braking command unless the vehicle 10 is in the regenerative limitation situation of the motor 160 (e.g., when the amount of braking demanded by the driver may not be satisfied by regenerative braking). When the vehicle 10 is in the regenerative limitation situation of the motor 160, the HCU 100 may be configured to distribute a shortage, acquired by subtracting the maximum amount of regenerative braking from the amount of braking demanded by the driver, to the friction braking command.

The MCU 120 may be configured to operate the inverter connected to the motor 160 based on the regenerative braking command to generate counter-torque that corresponds to the amount of regenerative braking corresponding to the regenerative braking command, and transmit output torque of the motor 160 to the HCU 100 (Operation S45). The amount of regenerative braking may be a value to execute regenerative braking by the motor 160 and the unit of the amount of regenerative braking may be Newton-meters. The EBS 200 may be configured to execute friction braking as much as the amount of friction braking based on the friction braking command (Operation S46). The amount of friction braking may be a value to control friction braking by the EBS 200 and the unit of the amount of friction braking may be Newton-meters.

The above-described Operations S41 to S46 included in Operation S40 may be repeated in a designated cycle. With reference to FIGS. 7 and 8, time t0 to time t5 are substantially the same as time t0 to time t5 of FIG. 4 and distribution of braking force may be executed by the HCU 100 at each of time t0 to time t5. It may be assumed that, as the brake pedal is engaged by the driver at time t0, the amount of braking demanded by the driver linearly may increase up to time t4 and thereafter may be uniformly maintained.

Under the assumption that the regenerative limitation situation of the motor 160 does not occur, the amount of regenerative braking may be determined as being the same as the amount of braking demanded by the driver at each of time t0 to time t5. Accordingly, the amount of friction braking may become 0 at all time sections and consequently, the total amount of braking, i.e., the sum of the amount of regenerative braking and the amount of friction braking, may become the same as the amount of braking demanded by the driver and the amount of regenerative braking (indicated by one line in FIG. 7). In other words, when the current braking situation is not the emergency braking situation, the HCU 100 may become the subject of braking control, and the amount of braking demanded by the driver may be promptly reflected in the regenerative braking command to eliminate intervention of unnecessary friction braking, thereby improving fuel efficiency and drivability.

Accordingly, in the emergency braking situation, a point of time when the allowable amount of regenerative braking is calculated and a point of time when the amount of friction braking is determined according to the execution amount of regenerative braking based on the allowable amount of regenerative braking may be separated from each other using a time delay between the respective control units and, thus, responsiveness of friction braking may be improved. Further, when the emergency braking situation does not occur, when the amount of braking demanded by the driver is calculated, a regenerative braking command and a friction braking command may be generated without a communication delay and, thus, generation of unnecessary friction braking may be prevented and fuel efficiency and drivability may be improved. In other words, the subject in charge of distribution of braking force may be changed according to braking situations, thereby properly satisfying responsiveness of friction braking, fuel efficiency and drivability.

Each of the HCU 100, the MCU 120, the TCU 130 and the EBS 200 may be implemented as one or more processors operated by a set program. The set program may be programmed to perform the respective operations of the braking method of the hybrid vehicle 10 in accordance with one exemplary embodiment of the present invention.

Further, the above-described braking method of the hybrid vehicle 10 may be implemented as computer executable code in a computer readable recording medium. Computer readable recording media may include all types of recording media in which data decoded by computer systems is stored. For example, the computer readable recording media may be a ROM (Read Only Memory), a RAM (Random Access Memory), a magnetic tape, a magnetic disk, a flash memory, an optical data storage device, etc. Further, the computer readable recording medium may be distributed to computer systems connected by a network and be stored and executed as code which is readable by computers in a distributed manner.

As apparent from the above description, in a hybrid vehicle and a braking method thereof in accordance with one exemplary embodiment of the present invention, in an emergency braking situation, a point of time when the allowable amount of regenerative braking is calculated and a point of time when the amount of friction braking is determined according to the execution amount of regenerative braking based on the allowable amount of regenerative braking may be separated from each other using a time delay between respective controllers and, thus, responsiveness of friction braking may be improved.

Further, when the emergency braking situation does not occur, when the amount of braking demanded by the driver is calculated, a regenerative braking command and a friction braking command may be generated without a communication delay and, thus, generation of unnecessary friction braking may be prevented and fuel efficiency and drivability may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A braking method of a hybrid vehicle, comprising:
   determining, by an electric brake system based on a brake depth, whether a current braking situation is a general braking situation or an emergency braking situation;
   transmitting, by the electric brake system, the brake depth together with a control authority transfer signal to a hybrid controller, when the current braking situation is the general braking situation;
   calculating, by the hybrid controller without intervention of the electric brake system, a first amount of braking demanded by a driver corresponding to the brake depth, when the current braking situation is the general braking situation;
   generating, by the hybrid controller, a regenerative braking command to execute regenerative braking and a friction braking command to execute friction braking based on the first amount of braking demanded by the driver, when the current braking situation is the general braking situation;
   calculating, by the electric brake system, a second amount of braking demanded by the driver corresponding to the brake depth, when the current braking situation is the emergency braking situation; and
   executing, by the electric brake system, friction braking based on the second amount of braking demanded by the driver and an execution amount of regenerative braking acquired by monitoring a degree of execution of regenerative braking, when the current braking situation is the emergency braking situation.

2. The braking method according to claim 1, further comprising:
operating, by a motor controller, an inverter connected to a motor based on the regenerative braking command to generate counter-torque that corresponds to an amount of regenerative braking; and
executing, by the electric brake system, braking by brake cylinders of respective wheels based on the friction braking command.

3. The braking method according to claim 1, wherein, when the vehicle is not in a regenerative limitation situation of a motor, an amount of regenerative braking distributed to the regenerative braking command is the same as the first amount of braking demanded by the driver.

4. The braking method according to claim 1, wherein the determination of the current braking situation includes determining the current braking situation as the general braking situation when the brake depth is less than a first value and a variation of the brake depth is less than a second value.

5. The braking method according to claim 1, wherein the determination of the current braking situation includes determining the current braking situation as the emergency braking situation when the brake depth is a first value or greater or a variation of the brake depth is a second value or greater.

6. A hybrid vehicle comprising:
an electric brake system configured to determine whether a current braking situation is a general braking situation or an emergency braking situation based on a brake depth; and
a hybrid controller, when the current braking situation is the general braking situation, configured to receive the brake depth together with a control authority transfer signal from the electric brake system, to calculate without intervention of the electric brake system a first amount of braking demanded by a driver that corresponds to the brake depth and to generate a regenerative braking command to execute regenerative braking and a friction braking command to execute friction braking based on the first amount of braking demanded by the driver,
wherein, when the current braking situation is the emergency braking situation, the electric brake system is configured to calculate a second amount of braking demanded by the driver that corresponds to the brake depth and execute friction braking based on the second amount of braking demanded by the driver and an execution amount of regenerative braking acquired by monitoring a degree of execution of regenerative braking.

7. The hybrid vehicle according to claim 6, further comprising:
a motor controller configured to operate an inverter connected to a motor based on the regenerative braking command to generate counter-torque that corresponds to an amount of regenerative braking,
wherein the electric brake system is configured to execute braking by brake cylinders of respective wheels based on the friction braking command.

8. The hybrid vehicle according to claim 6, wherein, when the vehicle is not in a regenerative limitation situation of a motor, an amount of regenerative braking distributed to the regenerative braking command is the same as the first amount of braking demanded by the driver.

9. The hybrid vehicle according to claim 6, wherein the electric brake system is configured to determine the current braking situation as the general braking situation when the brake depth is less than a first value and a variation of the brake depth is less than a second value.

10. The hybrid vehicle according to claim 6, wherein the electric brake system is configured to determine the current braking situation as the emergency braking situation when the brake depth is a first value or greater or a variation of the brake depth is a second value or greater.

11. A braking method of a hybrid vehicle, comprising:
determining, by an electric brake system based on a brake depth and a variation of the brake depth, whether a current braking situation is a general braking situation or an emergency braking situation;
transmitting, by the electric brake system, the brake depth together with a control authority transfer signal to a hybrid controller, when the current braking situation is the general braking situation;
calculating, by one of the electric brake system and the hybrid controller, a first amount of braking demanded or a second amount of braking demanded by a driver that corresponds to the brake depth and an amount of friction braking for executing friction braking based on the current braking situation; and
when the current braking situation is the general braking situation, calculating, by the hybrid controller without intervention of the electric brake system, the first amount of braking demanded by the driver and calculating the amount of friction braking based on a regenerative limitation situation of a motor based on the first amount of braking demanded by the driver, and
when the current braking situation is the emergency braking situation, calculating, by the electric brake system, the second amount of braking demanded by the driver and calculating the amount of friction braking based on the second amount of braking demanded by the driver and an execution amount of regenerative braking acquired by monitoring a degree of execution of regenerative braking.

12. The braking method according to claim 11, wherein the determination of the current braking situation includes determining the current braking situation as the general braking situation when the brake depth is less than a first value and the variation of the brake depth is less than a second value.

13. The braking method according to claim 11, wherein the determination of the current braking situation includes determining the current braking situation as the emergency braking situation when the brake depth is a first value or greater or the variation of the brake depth is a second value or greater.

* * * * *